UNITED STATES PATENT OFFICE.

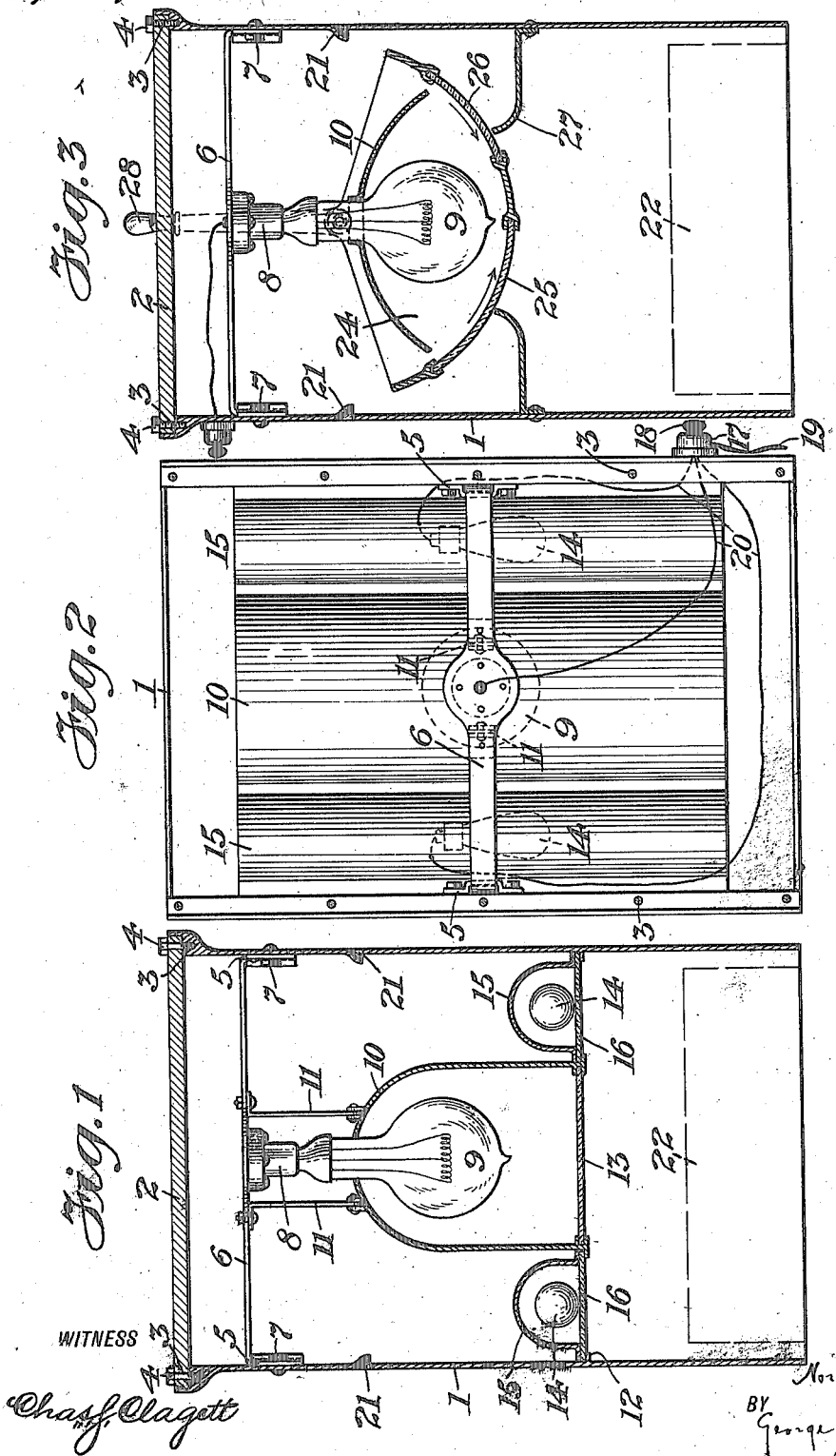

NORMAN MACBETH, OF NEW YORK, N. Y.

COLOR-IDENTIFICATION DEVICE.

1,249,443.

Specification of Letters Patent. Patented Dec. 11, 1917.

Application filed October 17, 1916. Serial No. 126,114.

*To all whom it may concern:*

Be it known that I, NORMAN MACBETH, a subject of the King of Great Britain, and resident of New York city, in the county of New York and State of New York, have invented certain new and useful Improvements in Color-Identification Devices, of which the following is a specification.

My invention concerns means for identifying colors, such for instance as the colors of colored fabrics and other colored media, and it has for its object to provide a simple and compact unit device, wherein the colors of such colored media can be readily and expeditiously examined, compared, matched and harmonized by alternately illuminating them with light equivalent to daylight and with artificial light, without any necessity of shifting the colored medium under examination.

By the term "light equivalent to daylight" I understand the light given by any artificial light source, which has been chosen or corrected so as to furnish a light equivalent to daylight, while by the term "artificial light" I understand the light given by any ordinary artificial light source uncorrected for daylight quality.

It is a well known fact that colored substances owe their color to the light reflected from them and therefore the great majority of them show entirely different colors in daylight than they do under artificial light, such as that, for instance, from an ordinary incandescent lamp.

Owing to this fact it has heretofore been exceedingly difficult to select colors, for instance those of colored fabrics, so that they would match when worn in daylight and in artificial light. Thus it has been necessary for the buyer of colored dress goods, after selecting goods in a store under artificial light, to take them to a place, such as a window or the door, where he could see them in daylight in order to get an idea of what he was buying. It is, however, exceedingly difficult for the eye to retain a memory of color and this procedure has been therefore exceedingly unsatisfactory. Even when the matching of colors was done in daylight, the buyer had no guarantee that they would also match under artificial light. The same is true with regard to colored prints and similar articles.

My invention aims at overcoming these difficulties by providing a color identification device, in which a colored fabric or any other colored medium, such for instance as a colored print or photograph, can be conveniently and expeditiously examined under conditions of daylight and of artificial light, and wherein the same may be instantaneously subjected to such conditions alternately, without its being necessary to shift the colored medium under examination, so as to no longer leave any doubt as to the true color of the said media both in daylight and under artificial light.

I attain this result by providing a self-contained unit apparatus, in which a source of light equivalent to daylight and an artificial light source are arranged in conjunction, the said light sources being of sufficient intensity to furnish an adequate illumination for examining the colored medium. I also provide means by which the said light sources can be quickly brought into alternate use, so that at one instant the colored medium is illuminated by the daylight source and the next instant by the artificial light source.

Instead of using separate sources of light I may also use a single light source and provide my device with mechanical means whereby a color filter or similar means is inserted or withdrawn between the source of light and the colored medium under examination for the purpose of alternately illuminating the colored medium with light corrected for daylight and with ordinary artificial light.

In any case the colored medium is not shifted during this change of light, thus relieving the eye from the necessity of remembering the colors for an appreciable time. I further provide my device with means which prevent the possibility of obtaining a mixture of the light from the daylight and the artificial light source.

My device thus enables me to make an instantaneous comparison of the colors of a colored medium both under daylight and under artificial light conditions and to be absolutely sure of matching and harmonizing the said colors under both the said conditions.

My invention is illustrated in the accompanying drawings. Figure 1 is a vertical cross section of an apparatus embodying my invention. Fig. 2 is a plan view of the same, the cover having been removed. Fig. 3 is a vertical cross section of a modification of my device.

The device shown in Figs. 1 and 2 consists of a rectangular box 1 of sheet iron or the like, flared out at the top so as to provide a seat for the removable cover 2 which is fastened to the box 1 by means of threaded pins 3 and nuts 4. The two side walls of the box 1 carry brackets 5, 5, which are adapted to receive the extremities of a flat iron strap 6, the said extremities being bent downward at right angles and held in the brackets 5, 5, by means of screws 7. The said strap 6 serves as support for an ordinary insulated incandescent lamp socket 8, which is fastened thereto in the center and is provided with the usual terminals for connecting the same to a source of electricity. The said socket 8 carries an incandescent lamp 9, which is preferably a metal filament lamp of the gas-filled type. The said lamp is surrounded by an oblong curved reflector 10, which completely incloses the same and is supported from the said strap 6 by two metallic supporting strips 11, 11. The lower extremity of the reflector 10 abuts against a metallic partition 12, extending completely across the box and dividing the same into two compartments. Below the said reflector 10 the said partition 12 is provided with a rectangular opening adapted to be closed by a colored filter 13 of blue glass or the like, which serves the purpose of correcting the color value of the light furnished by the incandescent lamp 9 and making it equivalent to that of daylight. The said partition 12 also supports two ordinary incandescent lamps 14, 14, arranged on opposite sides of the reflector 10. The said incandescent lamps 14, 14, are also surrounded by oblong reflectors 15, 15, the lower extremity of which abuts against the partition 12. Underneath the reflectors 15, 15, the said partition 12 is also provided with rectangular openings which are adapted to be closed by plates 16, 16 of clear glass.

At a convenient height one of the side walls of the box 1 carries an insulated three pole switch 17, provided with a rotatable knob 18. Electric current is led to the said switch 17 by wires 19 connected to any suitable current supply, the terminals of the said switch 17 being connected by leads 20 to the lamps 9 and 14, 14 in such a manner, that a rotation of the switch knob 19 causes alternately the lamp 9 to be lighted alone or the lamps 14, 14 to be lighted alone.

Slots 21 provided in the side walls of the box 1 serve the purpose of ventilation and a rectangular opening 22, cut out of the lower portion of the front wall of the box 1 allows the introduction into the box 1 of the objects to be examined.

It is obvious that the above described arrangement allows me to illuminate colored media alternately in rapid succession with a light equivalent to daylight, such as that furnished by the lamp 9 passing through the colored filter 13, and with ordinary artificial light, such as that furnished by the incandescent lamps 14, 14, the light of which is not corrected for daylight quality, without its being necessary to shift the colored medium under examination, and without the light from one source of light interfering with that of the other one. I am thus enabled to identify colors with certainty and to match and harmonize them without doubt.

Fig. 3 shows a modification of my device, wherein the illumination of the colored medium to be examined is furnished by a single light source and wherein the alternation between light equivalent to daylight and ordinary artificial light is produced by mechanical instead of by electrical means.

The device consists of a box 1, similar to that shown in Figs. 1 and 2, closed by a cover 2, fastened to the box by means of pins 3 and nuts 4. The strap 6 supports, also in the same manner as shown in Figs. 1 and 2, by means of an insulated socket 8, an incandescent lamp 9, surrounded by reflector 10. The said lamp and reflector are also located in a movable rectangular box 24 of sheet iron, shaped in the form of a segment of a circle, and suitably supported by trunnions on the front and rear side of the box 1. The said box 24 receives the rotating movement by means of a crank 28 attached to the front side of the box 1. The curved bottom of the said box 24 is provided with a larger opening, closed by a color filter 25 of blue glass or similar material and with a smaller opening closed by a clear glass plate 26. The partition 27 slopes upward so as to meet the box 24 and prevent the entrance of light into the lower part of the device, except such light as comes respectively through the blue glass 25 or the clear glass 26 as they are brought respectively into alternate position by means of the crank 28. It is obvious that also in this device the colored media which are to be examined in the device are illuminated in rapid alternation with light equivalent to daylight and with ordinary artificial light.

It is understood that I do not confine myself to the precise construction and arrangement of parts shown in the accompanying drawing, as the same merely illustrate the principle of my invention and it is obvious that various modifications and changes of form may be introduced therein without departing from the spirit of my invention.

Having thus described my invention I claim:

1. In a device for the identification of colors, the combination of means adapted to furnish light equivalent to daylight with means adapted to furnish artificial light and means adapted to allow an instantaneous change from one light to the other.

2. In a device for the identification of colors, the combination of means adapted to furnish light equivalent to daylight, means adapted to furnish artificial light, means adapted to allow an instantaneous change from one light to the other, and means to prevent a mixture of the said lights.

3. In a device for the identification of colors, a light source giving light equivalent to daylight, a second light source giving artificial light and means to instantaneously alternate the light from the said light sources.

4. In a device for the identification of colors, a light source giving light equivalent to daylight, a second light source giving artificial light and electrical means to instantaneously alternate the light from the said light sources.

5. A device for the identification of colors, comprising a light source giving light equivalent to daylight, a second light source giving artificial light, means for quickly alternating the light from the said light sources and means preventing a mixture of the said lights.

6. A device for the identification of colors, comprising a light source giving light equivalent to daylight, a second light source giving artificial light, electrical means for quickly alternating the light from the said light sources and means preventing a mixture of the said lights.

Signed at New York in the county of New York and State of New York this 11th day of October A. D. 1916.

NORMAN MACBETH.

Witnesses:
E. R. TREVERTON,
W. Y. TRACEY.